United States Patent [19]

Chasen et al.

[11] 4,049,225
[45] Sept. 20, 1977

[54] MOUNTING BRACKET HAVING HINGED BASE

[75] Inventors: Lee Richard Chasen, Port Chester; Ruediger Einhorn, Katonah, both of N.Y.

[73] Assignee: Coats & Clark, Inc., Stamford, Conn.

[21] Appl. No.: 686,048

[22] Filed: May 12, 1976

Related U.S. Application Data

[62] Division of Ser. No. 598,399, July 23, 1975, abandoned.

[51] Int. Cl.² .......................................... F16M 13/02
[52] U.S. Cl. .............................. 248/219.4; 248/220.1
[58] Field of Search ................. 248/126, 207, 221 D, 248/222, 518, 536, 220.1, 219.4

[56] References Cited

U.S. PATENT DOCUMENTS

| 303,877 | 8/1884 | Neblett | 248/222 |
| 1,159,813 | 11/1915 | Volkhardt | 248/222 X |
| 1,643,689 | 9/1927 | Woodin | 248/536 X |
| 1,672,625 | 6/1928 | Rose | 248/536 |
| 2,637,516 | 5/1953 | Kessler | 248/126 UX |
| 3,408,033 | 10/1968 | Kochevar et al. | 248/126 X |

*Primary Examiner*—William H. Schultz
*Attorney, Agent, or Firm*—Burgess, Ryan and Wayne

[57] ABSTRACT

A mounting bracket has a pair of base members hinged together with the base members having separate mounting surfaces to enable affixing them to walls or the like extending at different angles. A mounting projection extends from one base member, preferably normal to the mounting surface thereof, at the pivotal joint. The mounting bracket may be die cast, with an edge of one base member forming a portion of the die for the mounting surface of the other base member. The pivotal axis is preferably displaced so that it is closer to the facing edge of one base member than to the facing edge of the other base member.

8 Claims, 14 Drawing Figures

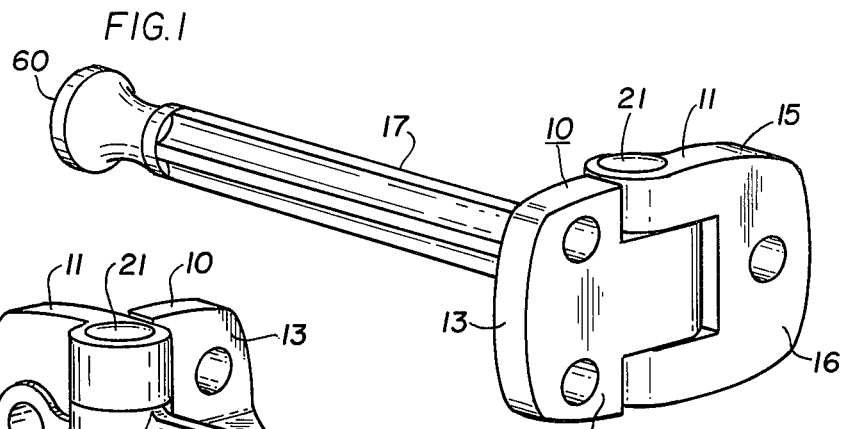
FIG. 1
FIG. 2
FIG. 3
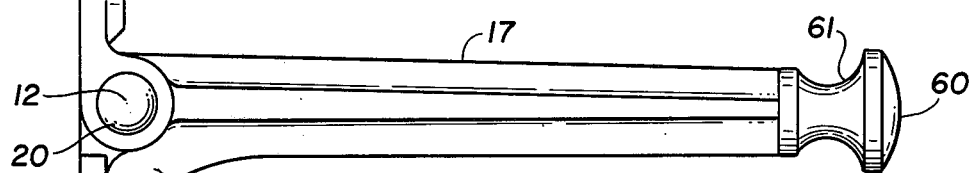
FIG. 4
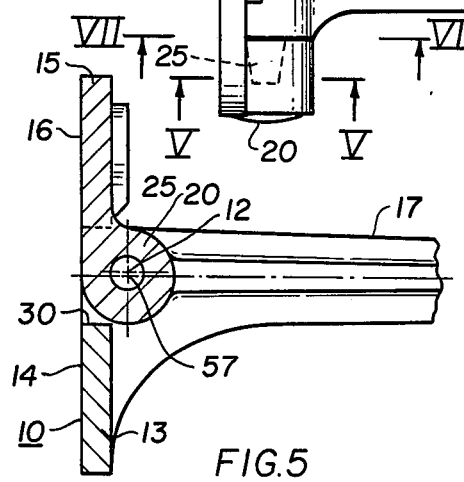
FIG. 5
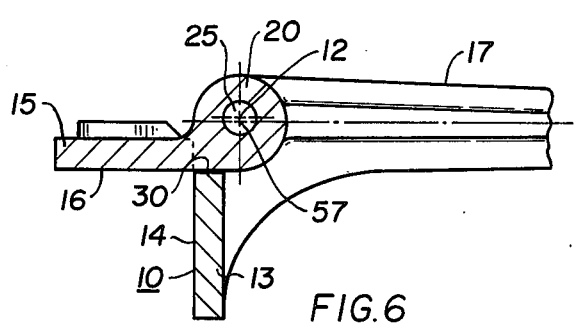
FIG. 6

MOUNTING BRACKET HAVING HINGED BASE

This is a division, of application Ser. No. 598,399, filed 7/23/75 abandoned.

This invention is related to mounting brackets and methods for making the same, and is particularly directed to the provision of a mounting bracket adapted to be affixed to a wall or the like for suspending articles, the mounting bracket may also conveniently be formed as a shelf bracket, for the support of shelves or similar structures.

Conventional wall mounting brackets are provided with a single wall engaging surface, whereby such mounting brackets are adapted for mounting only on flat surfaces. On occasion, it is desirable to suspend an article at a location where no flat wall surface is available, for example, at the corner of a wall, or at a horizontally extending edge. Conventional mounting brackets are generally not suitable for mounting at such locations.

Briefly stated, the present invention is directed to the provision of a wall mounting bracket which is adapted to be mounted on flat surfaces, at corners and, if desired, on rounded surfaces.

In accordance with the invention, the mounting bracket is provided with two base members hinged together, each base member having a mounting surface, whereby the mounting surfaces may be aligned for mounting on a flat wall, or may be angularly displaced for use of the mounting bracket at a corner or on an irregular surface.

The mounting bracket has a mounting projection fixably extending from one of the base members, the mounting projection extending from the one base member at the pivotal axis of the bracket, and preferably in a direction normal to the mounting surface of the one base member.

The mounting bracket in accordance with the invention is readily adaptable to formation by die casting techniques, whereby one base member is initially die cast with bearing surfaces for forming the pivot joint, and the thus-formed bearing surfaces are employed as a part of the die for bearing surfaces of the other base member. In a preferred method for forming the mounting bracket by this technique, one edge extending from the mounting surface of the first cast die member is employed as a part of the die for the mounting surface of the second die cast member, and the pivotal axis of the mounting bracket is closer to this edge of the second cast member than to the corresponding edge of the first die cast member in order to insure lack of mutual interference between the base members upon relative rotation thereof.

It will be approved, of course, that the mounting bracket of the invention may be formed by other techniques. For example, it may be fabricated of sheet metal.

In order that the invention will be more clearly understood, it will now be disclosed in greater detail with reference to the accompanying drawings, wherein:

FIG. 1 is a perspective view of a mounting bracket in accordance with the invention with the mounting surfaces of the two base members thereof in the same plane;

FIG. 2 is a perspective view of the mounting bracket of FIG. 1, with the mounting surfaces extending at right angles to one another;

FIG. 3 is a side view of the mounting bracket of FIG. 1;

FIG. 4 is a top view of the mounting bracket of FIG. 1;

FIG. 5 is a cross sectional view of a portion of the mounting bracket of FIG. 1, taken along the lines V-V of FIG. 4;

FIG. 6 is a cross sectional view corresponding to FIG. 5, with the mounting surfaces of the base members extending at right angles to one another;

Figure 7:
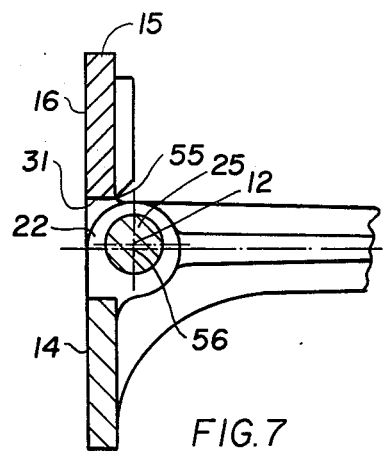
FIG. 7, is a cross sectional view of a portion of the mounting bracket of FIG. 1, taken along the lines VII-VII of FIG. 4.

Referring now to the drawings, and more in particular to FIGS. 1–4, the mounting bracket in accordance with the invention is comprised of a first member 10 hinged to a second member 11 at an axis 12. The first member 10 has a base 13 with a preferably flat mounting surface 14, and the member 11 has a base 15 with a preferably flat mounting surface 16. The bases 13 and 15 are hinged together about the axis 12, in a manner similar to that of a conventional hinge having an offset axis, the hinge axis 12 extending parallel to and spaced from the planes of the mounting surfaces 14 and 16, with all of the material of each of the members 10 and 11 extending only in one direction on the planes of the respective mounting surfaces. A mounting projection 17 fixadly extends from the base 13 of member 10, the projection 17 extending generally from the region of the axis 12 of the mounting bracket. In the illustrated embodiment of the invention, the mounting projection 17 is a generally straight member, and preferably extends substantially normal to the plane of the mounting surface 14. It will be apparent, of course, that the mounting projection 17 may have other forms. For example, the projection may be formed as a hook or a ring, or it may have any other suitable shape for the suspending of articles.

The mounting projection 17 is preferably formed as a unitary member with the base 13, and as will be discussed in greater detail in the following paragraph, the base 13 and mounting projection 17 may be cast as a unitary member.

The bases 13 and 15 are hinged together, so that the planes of their respective mounting surfaces may coincide, as shown in FIGS. 1, 3 and 4, or the base members may be pivoted to a position in which the planes of their mounting surfaces extend at right angles to one another, as illustrated in FIG. 2. It is, of course, apparent that the angular displacement between the mounting surfaces may be adjusted to intermediate angles, depending upon the surface upon which the mounting bracket is to be mounted, and that, if desired, the pivotal mount may be designed to enable positioning of the mounting surfaces at relative angles somewhat greater than 180°. It is preferred, however, as will be discussed in greater detail in the following paragraph, that the minimum angle between these surfaces be no less than 90°.

The base 15 is provided with a pair of outer extensions 20, 21 at the axis 12, for forming the pivot joint, and the base 13 has a central extension 22 disposed axially between the extensions 20 and 21 at the axis 12. The extensions 20 and 21 may be pivotally mounted to the sides of the extension 22 by any conventional means, such as, for example, a pin (not shown) extending through these extensions along the axis 12. In the preferred embodiment of the invention, however, as shown in dashed lines in FIG. 4, opposed tapered projections 25, 26 are provided on opposite sides of the extension 22 at the axis 12, these projections 25, 26 extending into similarly shaped recesses in the extensions 20 and 21 respectively. The tapered projections 25, 26 form bearing surfaces and the engaging recesses 20, 21 also form bearing surfaces for the pivotal joint of the mounting bracket in accordance with the invention.

Referring now to FIG. 5, which illustrates a cross sectional view of the mounting bracket through the extension 20, the base 13 has an edge 30 facing the axis 12, and extending normal to the mounting surface 14 and parallel to the axis 12. The extension 20 of the base 15 is generally barrel-shaped. When the base 15 is pivoted so that the mounting surface 16 extends normal to the plane of the mounting surface 14, as illustrated in FIG. 6, it is seen that the mounting surface 16 engages the edge 30 of the base 13 to inhibit further reduction in the angles between the mounting surfaces 14 and 16.

FIG. 7 illustrates a cross sectional view of the mounting brackets at the hinge joint between the extensions 20 and 22. At this cross section of the mounting bracket, the extension 22 also has a generally barrel-shaped cross section. The base 15 has an edge 31 extending normal to the mounting surface 16 and facing the pivotal axis 12. Referring to the FIG. 8, when the base 15 is pivoted so that the mounting surface 16 is perpendicular to the mounting surface 14, the edge 31 of the base 15 engages the mounting surface 14. This engagement also serves to inhibit reduction of the angle between the mounting surfaces 14 and 16.

It is, of course, apparent that cross sections of the mounting bracket at the opposite side of the mounting bracket appear similar to those of FIGS. 5-8. Thus, the base 13 has a further edge (not shown) in the plane of the edge 30, and separated therefrom by the extension 22, and the edge 31 appears between the two generally barrel-shaped extensions 20 and 21. The edge 30 is consequently axially aligned with the extension 20, and the corresponding (not shown) edge of the base 13 is axially aligned with the extension 21. Similarly, the edge 31 is axially aligned with the extension 22.

Figure 9:
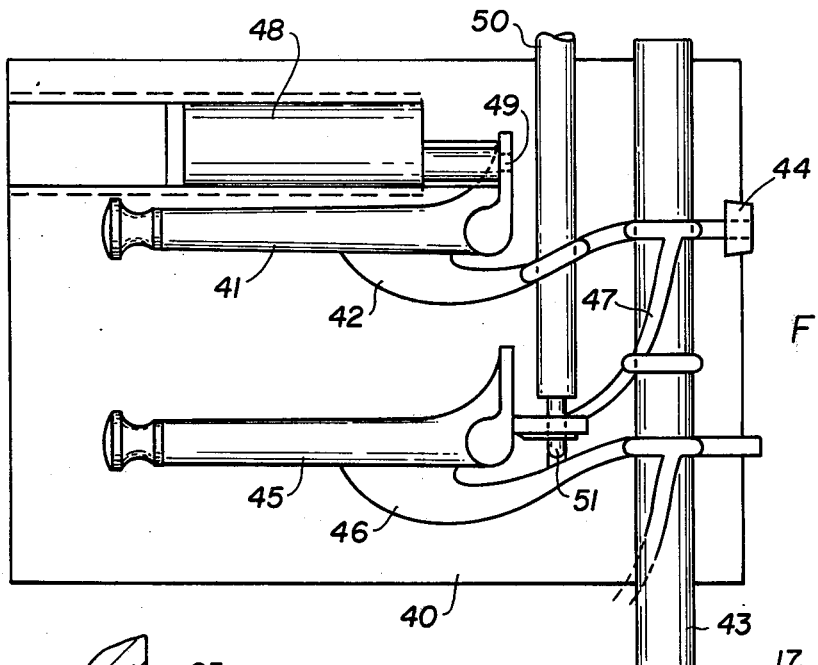
FIG. 9 is a simplified illustration of a method of casting the mounting bracket in accordance with the invention.

A preferred process for die casting the mounting bracket in accordance with the invention is diagrammatically illustrated in FIG. 9. This figure is a simplified view of one die 40 of a set of movable dies. The die 40 has a cavity 41 shaped to form the member 10 including the base and mounting projection thereof. The cavity 42 extends to the cavity 41, for forming the gates. The cavity 42 extends around a core rod 43, and thence to an aperture 44.

Figure 8:
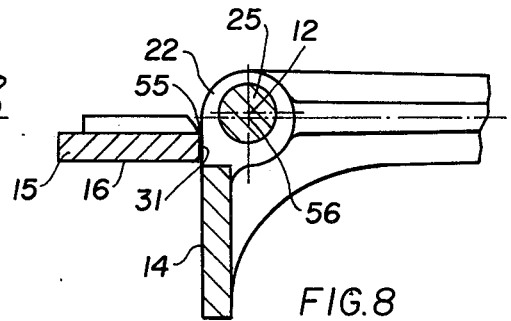
FIG. 8 is a cross sectional view corresponding to FIG. 7 with the base members extending at right angles to one another.

In addition, the die 40 has a cavity 45 displaced from the cavity 41, the cavity 45 having the shape of the combined members 10 and 11. It is preferred that the cavity 45 have the shape of the combined members 10 and 11 with the mounting surfaces thereof extending at right angles to one another as illustrated in FIGS. 2, 6 and 8.

The die 40 has a further cavity 46 corresponding in shape to the cavity 42, and an additional cavity 47 extending from the portion of the cavity 45 corresponding to the member 11 to the injection aperture 44, the gate cavity 47 also extending around the core rod 43.

In the first step of die casting the mounting bracket, the casting metal is injected through the aperture by way of gate 42 to the cavity 41, to form the member 10. The thus-cast member 10, with the gate affixed thereto, is moved by means of the core rod 43 to the cavity 45, whereupon in the second casting step, the metal, injected by way of the gate cavity 47, forms the mounting bracket part 11, employing portions of the previously cast member 10 as a portion of the die. Thus, the bearing region of the previously cast member serves as a die for the bearing regions of the member 11, the edges 30 of the previously cast member form a die for a portion of the mounting surface 16 of the member 11, and a portion of the mounting surface 14 of the member 10 serves as a die for the edge 31 of the member 11. During the second casting step it is, of course, evident that a second member 11 is being simultaneously cast.

Mounting holes extending to the bases of the mounting bracket may also be formed during the casting process. For this purpose, a pull core 48 is provided in the die 40, having a projection 49 positioned to form one or more mounting holes in the base member 10, and a pull core 50 having a projection 51 for forming one or more mounting holes in the member 11 is also provided in the die 40. Thus, following the injection of die casting metal into the cavities 41 and 45, the pull cores 48 and 50 are retracted, in order to permit the removal of the mounting bracket from the cavity 45 and the displacement of a member 10 from the cavity 41 to the cavity 45 by movement of the core rod 43.

Following removal of the fully cast mounting bracket in the cavity 45, the gates are removed by conventional techniques. This type of die casting, employing one die cast member as a portion of the die for a second die cast member, in the formation of an articulated article, is disclosed, for example, in U.S. Pat. No. 2,818,494, Morin. It is preferred in this form of casting that the bearing surfaces formed be frustoconical, i.e., tapered, projections and complimentary recesses.

Referring again to FIGS. 5-8, it is evident that the casting of the members 10 and 11 in the above described position, i.e., in the position shown in FIGS. 6 and 8, simplifies the casting of the mounting bracket, since it avoids the necessity for further movable die parts, such as would be required to form the recesses adjacent the edges 30 and 31 if the mounting brackets were cast in the positions illustrated in FIGS. 5 and 7. Die casting of the mounting bracket in the position of FIGS. 6 and 8, however, may result in interference, for example, between the barrel-shaped portion 22 and the inner corner 55 of the edge 31, upon relative rotation of the members 10 and 11. In order to avoid this interference, in accordance with the invention, the pivotal axis 12 is displaced with respect to the centers of the barrel-shaped portions of the mounting bracket. Thus, referring to FIG. 7, the pivotal axis 12 is closer to the plane of the edge 31 than the center 56 of the barrel portion 22. Similarly, in order to avoid interference between the barrel portion 20 and the edge 30, the pivotal axis 12 is closer to the plane of the edge 31 than the center 56 of the barrel portion 22. It is to be noted that the pivotal axis 12 is at the same distance from the mounting surface 14 as from the mounting surface 16, and that, due to the formation of the mounting bracket by the above-described process, the mounting surfaces 14 and 16 extend from their respective edges 30 and 31, in the regions of the extensions 20, 21 and 22, toward the axis 12 a distance corresponding to the thicknesses of the bases 13 and 15.

In one example of the invention, the mounting bracket was die cast from Zamak No. 3 zinc alloy, with the pivotal axis 12 being displaced from the planes of the surfaces 14 and 16 by 0.15 inches. The bases 13 and 15, at the edges 30 and 31 respectively were about 0.1 inches thick. The barrel-shaped portions 20, 21 and 22 had diameters of about 0.3 inches. The plane of the edge 31 was about 0.15 inches from the center of the barrel-shaped portion 22, while the plane of the edge 31 was about 0.148 inches from the axis of rotation 12. Similarly, the plane of the edge 30 was about 0.15 inches from the center of the barrel-shaped portion 20, while this plane was about 0.150 inches from the pivotal axis 12. With such dimensions, interference between the base members 13 and 15 during relative rotation of the elements, was avoided.

It will be apparent, of course, that the above dimensions and material are exemplary only, and that other materials and dimensions may be employed within the above-described teaching of the invention.

Referring again to FIGS. 3 and 4, in the preferred embodiment of the invention, the end 60 of the mounting projection 17 away from the mounting surfaces 14 and 16 is shaped to retain a cord, hook, or other hanging devices thereon. Thus, a rounded angular groove 61 is provided adjacent the end 60 of the mounting projection, and the diameter of the end 60 is enlarged to inhibit the slipping of mounting devices therefrom.

Figure 10:
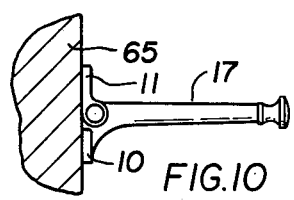
FIGS. 10–14 are simplified illustrations of the use of the mounting bracket of FIG. 1, on a flat surface, on an underlip, on an overlip, on a vertical corner, and on a round mounting surface, respectively.
Figure 11:
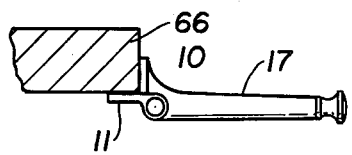
Figure 12:
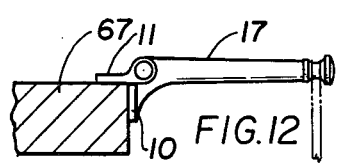

Referring now to FIG. 10, the mounting bracket in accordance with the invention is therein illustrated mounted on a flat vertical surface 65. In the illustrated mounting position, the axis of the mounted bracket is illustrated as horizontal, although it will be evident that alternatively the mounting bracket may be mounted on a flat surface with a vertically extending axis. As illustrated in FIG. 11, the mounting bracket of the invention may be mounted at an underlip 66, with the mounting surface of the member 10 being affixed to the vertical surface at the underlip and the member 11 being mounted to the horizontal surface at the underlip so that the mounting projection extends horizontally. Similarly, the mounting brackets may be mounted to an overlip 67, as illustrated in FIG. 12, with the mounting projection again extending horizontally. In the mounting positions of FIGS. 11 and 12, the pivotal axis of the mounting bracket is horizontal.

Figure 13:
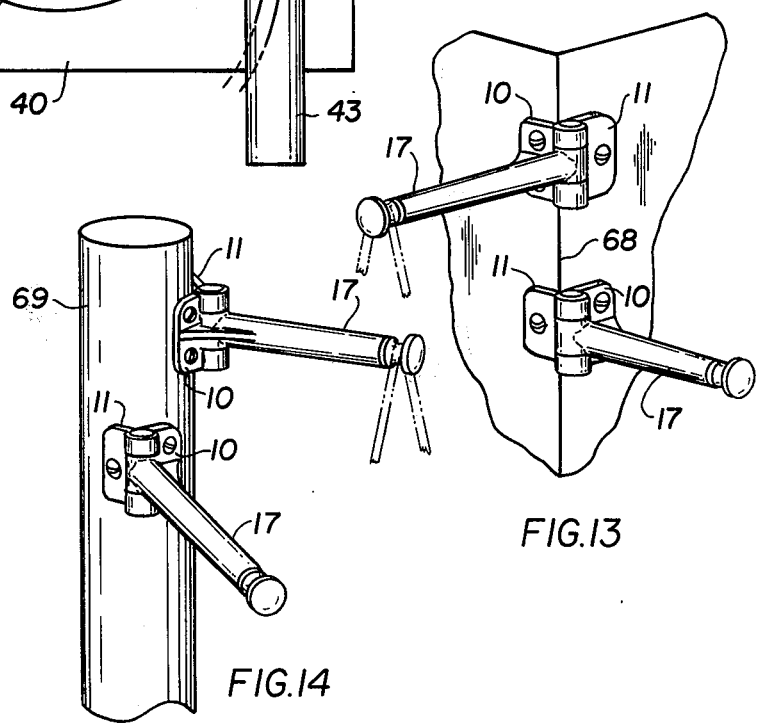

Referring to FIG. 13, the mounting bracket may also be mounted to a vertical corner 68, for example, a corner of a wall. In this case, the pivotal axis of the mounting bracket is arranged pivotally at the corner, with the member 12 being affixed to one wall surface and the member 11 being affixed to the other wall surface at the corner. In each of the mounting arrangements of FIGS. 11-13, where the mounting corners are at right angles, the mounting surfaces of the mounting brackets of the invention are positioned to be at right angles to one another.

Figure 14:
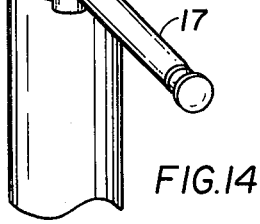

As illustrated in FIG. 14, the mounting bracket in accordance with the invention may also be mounted on a rounded surface 69. In this case, the angle between the mounting surfaces of the mounting bracket is adjusted to fit, as nearly as possible, the surface upon which the mounting bracket is to be mounted.

The mounting bracket in accordance with the invention is readily adapted to the suspension of articles of any desired type from flat or irregular surfaces. For example, the mounting bracket is particularly useful in the mounting of hanging plants, as illustrated in FIGS. 10-12, affixed, for example, by means of a cord or the like. Other hanging devices, such as hooks or the like may also be suspended at the end of the mounting bracket projection.

It is to be noted, particularly in FIG. 1, that two mounting holes are provided in one of the bases, i.e., the base 13, axially spaced apart with respect to the pivot ends, while a single mounting hole is provided in the other base, the single hole being generally centrally located in the axial direction with respect to the other two mounting holes. This arrangement provides the particular advantage that, when the bracket is mounted on a corner, mounting screws extending through the mounting holes of the bases will not interfere with one another in the structure on which the bracket is mounted.

While the invention has been disclosed and described with respect to a single embodiment thereof, it is readily apparent that many variations and modifications may be made therein, and it is therefore intended in the following claims to cover each such variation and modification as falls within the true spirit and scope of the invention.

What is claimed is:

1. A mounting bracket adapted to be mounted on flat, curved and angular surfaces,
   comprising first and second base members each having a substantially flat mounting surface and being hinged together for relative angular displacement about an axis displaced from and parallel to the planes of the mounting surfaces, whereby said second base member may be rotated from one position at which the planes of the mounting surfaces coincide and another position at which the planes of the mounting surfaces are normal to each other, the material of each member extending only on one side of the plane of the respective mounting surface, said axis extending through each base member,
   said first base member having a first edge extending normal to the respective mounting surface at a side thereof facing said axis, said second base member having a second edge extending normal to the respective mounting surface at a side thereof facing said axis, said first and second edges extending parallel to said axis and being spaced apart, said first and second edges being positioned to engage the mounting surfaces of said second and first base members respectively to limit the minimum angle between the planes of said mounting surfaces,
   said first base member further comprising a fixed mounting projection extending therefrom substantially at said axis.

2. The mounting bracket of claim 1 wherein the plane of said first edge is spaced from said axis a distance equal to the spacing between said axis and the plane of said mounting surface of said second base member.

3. The mounting bracket of claim 2 wherein the plane of said second edge is closer to said axis than the plane of said first edge.

4. The mounting bracket of claim 1 wherein said first edge of said first base member has first and second portions separated by a first extension parallel said second edge, said second base member has second and third extensions at opposite ends of said second edge and aligned with said first and second portions respectively, further comprising first and second bearing surfaces on opposite sides of said first extension, and third and fourth bearing surfaces on said second and third extensions respectively and engaging said first and second bearing surfaces respectively to form a hinged joint at said axis.

5. The mounting bracket of claim 4 wherein the plane of said second edge is closer to said axis than the plane of said first edge.

6. The mounting bracket of claim 5 wherein said second and third extensions are barrel shaped, with said axis being displaced from the axial center of said barrel shapes.

7. A mounting bracket adapted to be mounted on flat, curved and angular surfaces comprising first and second base members each having a substantially flat mounting surface and being hinged together for relative angular displacement about an axis displaced from and parallel to the planes of the mounting surfaces, whereby said second base member may be rotated from one position at which the planes of the mounting surfaces coincide and another position at which the planes of the mounting surfaces are normal to each other, the material of each member extending only on one side of the plane of the respective mounting surface, said axis extending through each base member, said first base member having a first pair of bearing surfaces directed in opposite directions at said axis, and said second base member having a second pair of bearing surfaces directed in opposite directions at said axis and engaging said first pair of bearing surfaces to form a hinged joint between said first and second base members, said first base member further comprising a fixed mounting projection extending therefrom substantially at said axis.

8. The mounting bracket of claim 7 wherein said first and second base members are die cast and said first and second pairs of bearing surfaces are not separable from each other without deformation of at least one of said first and second base members.

* * * * *

UNITED STATES PATENT OFFICE
CERTIFICATE OF CORRECTION

Patent No. 4,049,225      Dated September 20, 1977

Inventor(s) Lee Richard Chasen, et al

It is certified that error appears in the above-identified patent and that said Letters Patent are hereby corrected as shown below:

Column 2, line 35: "fixadly" should be --fixably--.

Column 6, line 64: Before "said" insert --to--.

Signed and Sealed this

*Twenty-first* Day of *March 1978*

[SEAL]

Attest:

RUTH C. MASON  
*Attesting Officer*

LUTRELLE F. PARKER  
*Acting Commissioner of Patents and Trademarks*